April 29, 1941.  E. J. ABBOTT  2,240,278
INSTRUMENT FOR RECORDING OR MEASURING SURFACE IRREGULARITIES
Filed Sept. 9, 1936  3 Sheets-Sheet 1
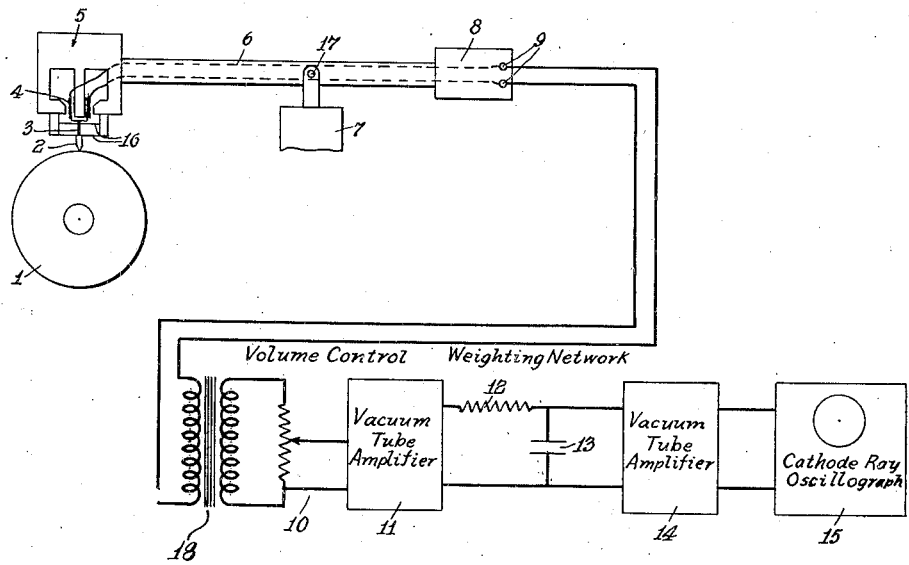
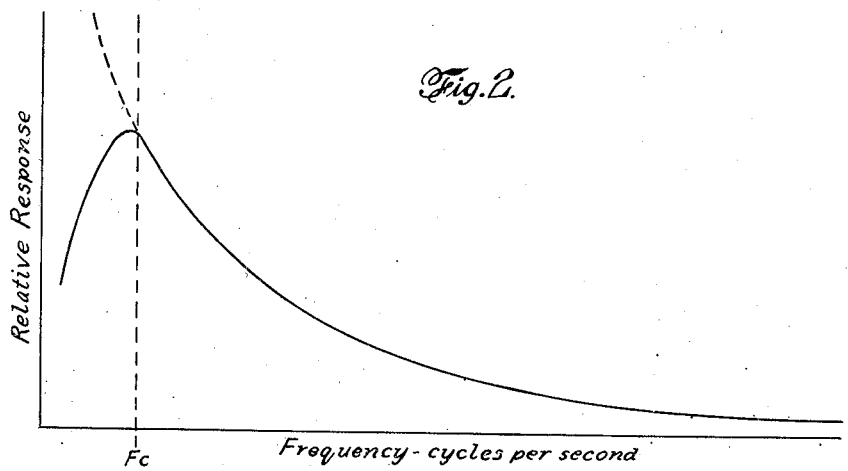
INVENTOR.
Ernest J. Abbott
BY
HIS ATTORNEY.

April 29, 1941.   E. J. ABBOTT   2,240,278
INSTRUMENT FOR RECORDING OR MEASURING SURFACE IRREGULARITIES
Filed Sept. 9, 1936   3 Sheets-Sheet 2
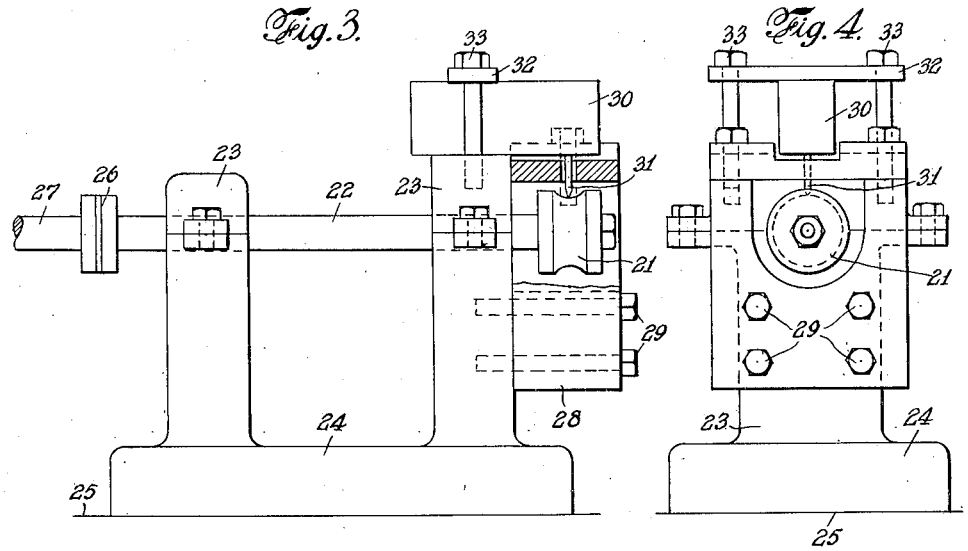
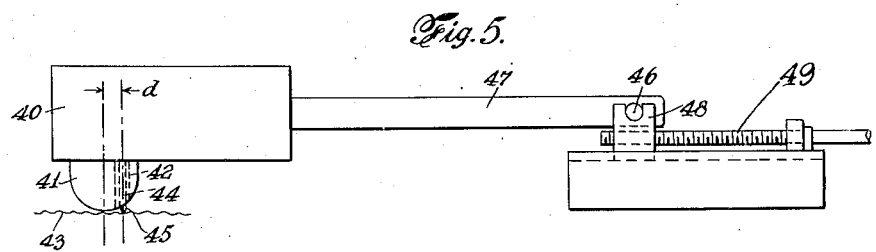
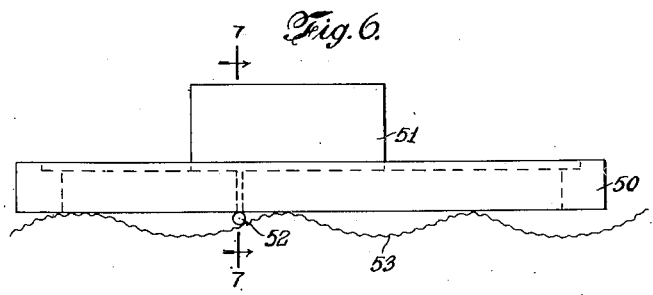 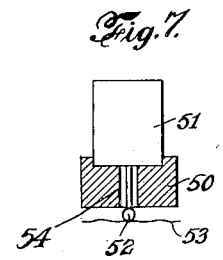
INVENTOR.
Ernest J. Abbott
BY Chas Lyon Russell
his ATTORNEY.

April 29, 1941.  E. J. ABBOTT  2,240,278
INSTRUMENT FOR RECORDING OR MEASURING SURFACE IRREGULARITIES
Filed Sept. 9, 1936  3 Sheets-Sheet 3

INVENTOR.
Ernest J. Abbott
BY
his ATTORNEY.

Patented Apr. 29, 1941

2,240,278

UNITED STATES PATENT OFFICE 2,240,278

INSTRUMENT FOR RECORDING OR MEASURING SURFACE IRREGULARITIES

Ernest J. Abbott, Ann Arbor, Mich., assignor to Physicists Research Company, Ann Arbor, Mich.

Application September 9, 1936, Serial No. 100,030

15 Claims. (Cl. 73—51)

This invention relates to improvements in instruments for recording or measuring the size and shape of surface irregularities, for example the surfaces obtained by various machining and finishing operations.

A sharp point called the tracer point is constrained to move in a direction substantially perpendicular to the nominal surface of the specimen, and is held in contact with the specimen by resilient means. Relative motion of the tracer assembly and the specimen is provided in a direction substantially parallel to the nominal surface, so that the displacements of the tracer point are a measure of surface irregularities. The direction perpendicular to the nominal surface is called "vertical," although obviously the specimen and the tracer may have any orientation with respect to the earth without affecting their action. The displacements of the tracer point, and hence, the dimensions of the surface irregularities are measured by electrical means herein described, which are an essential part of my invention.

In the drawings accompanying this specification and forming a part of the application, several practicable embodiments of the invention are illustrated, in which drawings, Figure 1 shows a form of the invention for investigating the outer surface of a work piece, which in the illustration is a body of revolution and shown from the end. Certain parts of the instrument are shown by conventional symbols and other parts by legends printed in spaces.

Figure 2 is a graph which is explained in the description.

Figure 3 shows an elevation of a modification designed largely to reduce the effects of vibration in some of the parts of the device illustrated in Figure 1.

Figure 4 is an end view of the device shown in Figure 3, looking at such figure from the right hand end.

Figure 5 is a diagrammatic view showing a form of the device in which the tracer unit has a support of large radius for traversing the surface which is being measured. This form of the device is designed primarily for measuring the roughness of the surface.

Figure 6 shows in diagram, a form of the device in which the tracer assembly is slidably mounted on a guide member.

Figure 7 is a cross section of the device shown in Figure 6, taken at a plane at about the line 7—7, looking from the left hand side toward the right.

Figure 8:
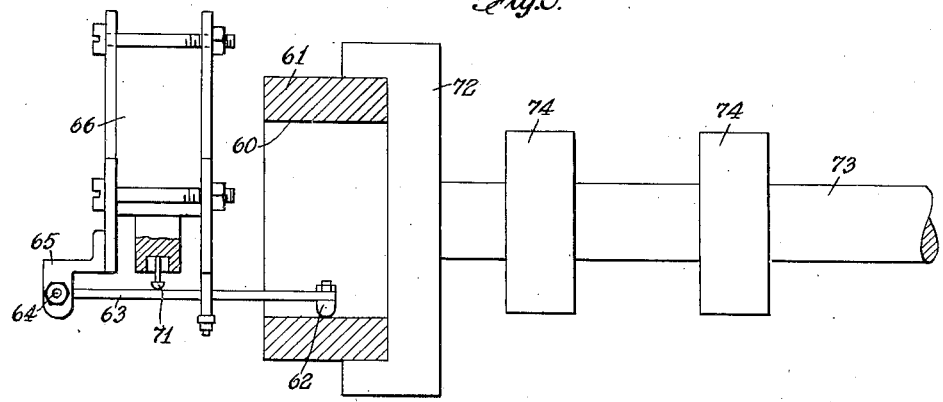
Figure 8 is partly a front view, partly in section, of a form of the instrument designed for measuring the inside surfaces of bodies of revolution.

Referring to Figure 1, the specimen 1, in this case a surface of revolution, is mounted on a shaft so that it can be rotated about its axis. The tracer point 2, is held in contact with the specimen by means of the springs 16, which support the small tube 3, which carries the tracer point 2. The spring tension is determined by the mass of the counterweight 8, which can be adjusted to give sufficient tension to hold the tracer in contact at all times, but not sufficient to scratch the surface. The tip of the tracer point is preferably of the form of a hemisphere, the tip radius being small enough to fully bottom the principal irregularities of the surface to be measured. I have found that a radius of .00005 inch to .0005 inch is suitable for this purpose, and that these can conveniently be made of diamond.

When the specimen is rotated about its axis, the tracer point moves up and down over the surface irregularities. The vertical movements of the tracer point are transformed into electrical voltages by one of the standard type electric phonograph reproducer units such as, the electro-magnetic, the crystal, or the condenser type. The essential characteristics are uniform frequency response and constancy of sensitivity. For convenience of illustration the electro-magnetic type has been shown in Figure 1 wherein the displacements of the point are indicated or measured by means of the coil 4, mounted integrally with the tube which carries the point, the permanent magnet 5, between whose poles the coil 4 is mounted, and associated electrical circuits. The magnet structure 5, is maintained stationary in space by means of the pivotal support 17, which carries the arm 6, which in turn carries the magnet 5, at one end, and the counterweight 8, at the other. The pivot is shown supported by a suitable mounting 7.

Motion of the coil 4, in the magnetic field generates electric voltage in the coil 4, and this voltage is carried to a suitable vacuum tube amplifier by means of flexible leads 9. The amplifier is of conventional design except for the special details outlined below, and consists of an input transformer 18, a calibrated volume control 10, and suitable vacuum tube sections 11 and 14 of conventional design.

In the electro-magnetic type of reproducer illustrated, the voltage generated in coil 4 is proportional to the velocity thereof, and since it is desired to measure displacement rather than velocity, it is necessary to provide compensation for this effect. This is done by the use of an electric circuit whose frequency-response is inversely proportional to the frequency of the applied voltage as indicated in Figure 2. This is accomplished by the resistor 12, and the condenser 13, shown in Figure 1. If the resistor 12, has a very large value compared with the reactance of the condenser 13, the current flowing through them for a given applied voltage will be independent of the frequency of the applied voltage. This current flowing through the condenser 13, will produce a voltage across the condenser inversely proportional to the frequency. This condenser voltage is applied to the high impedance input of the amplifier section 14, and hence the over-all characteristic of the circuit is inversely proportional to the frequency.

For the frequency range over which the weighting circuit response is inversely proportional to frequency, the output of the amplifier is proportional to the displacement of the tracer point. At very low frequencies it is not feasible to obtain the inverse response as the impedance of the condenser 13, becomes appreciable compared with the resistor 12, and also the impedance of coupling transformers, and resistor-condenser coupling circuits become such that the amplifier displays the well-known "low frequency cut-off" indicated to the left of the frequency $F_c$ in Figure 2.

The essential part of the instrument is the means for measuring vertical displacements of the tracer point. If one wishes to measure displacements on the specimen, the response on the indicator (oscillograph, meter, etc.) must be proportional to the displacement of the tracer point. If the electrical output of the reproducer is not proportional to the displacement of the point, it is necessary to employ a weighting network of such characteristics that the over-all response will be proportional to the tracer point displacement. The network for the electro-magnetic reproducer has been described above. Other appropriate networks are used for reproducers with different frequency response characteristics, for example, if the reproducer output were proportional to the acceleration of the tracer point, the associated corrective network should have a response inversely proportional to the second power of the frequency. To summarize, a weighting circuit may be used in conjunction with the amplifier to compensate for characteristics of other parts of the measuring means.

In Figure 1, the output of the amplifier 14, is measured with an oscillograph 15, a convenient type being the well-known cathode ray oscillograph of conventional design. The "vertical" displacements of the tracer point perpendicular to the nominal surface are measured by connecting the vertical plates of the oscillograph to the amplifier 14, so that the vertical displacements of the spot on the oscillograph are proportional to the heights of the surface irregularities over which the tracer is moved. This system is calibrated by producing known displacements of the tracer point, and observing the corresponding displacements of the spot of the oscillograph.

Figure 11:
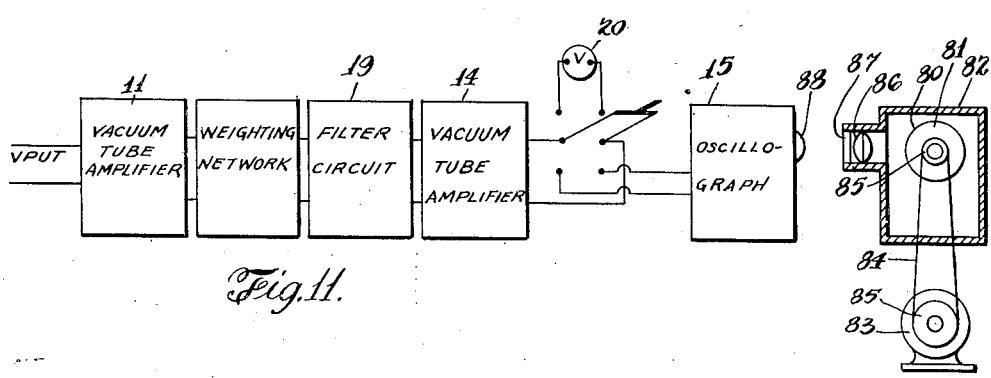
Figure 11 shows a modification of a portion of the apparatus shown in Figure 1, and diagrammatically illustrates a combination including a filter circuit, voltmeter, and photographic apparatus.

When it is desired to indicate or measure only irregularities whose wave lengths lie within a predetermined range, this can be accomplished by means of an electric wave filter 19 of conventional and appropriate design used in conjunction with the amplifier, and both a corrective (weighting) network and filter may be used simultaneously as diagrammatically illustrated in Figure 11. If it is desired to obtain a single reading of the average height of the irregularities on a section of specimen, this can be done by connecting a suitable A. C. voltmeter 20 to the output of the amplifier. On the other hand where it is desired to obtain information as to the actual shape of the profile under investigation, it is necessary to measure both vertical and horizontal displacements simultaneously. This is accomplished by means of a two dimensional representation wherein an oscillograph 15 is used to show the vertical motion.

An enlarged record of the surface profile can be obtained by photographing the oscillograph displacements on a photographic film 30, (Figure 11) moving at right angles to the direction of the movement of the oscillograph spot. The film or sensitized paper is carried on a drum 31, within a light-tight case 82. The drum is mounted on a shaft with suitable bearings, and driven from a suitable motor 83, by belt 84, and pulleys 85. A lens 86, and shutter 87, are provided in the box, together with conventional means (not shown) for excluding extraneous light, and the image appearing on the oscillograph screen 88, is focused on the film. Opening the shutter for a period of one revolution of the drum allows a corresponding portion of the oscillograph record to be recorded for future reference.

The "horizontal" magnification of the profile curve is determined by the ratio of film speed to the speed at which the surface of the specimen is moved with respect to the tracer assembly. Obviously, the horizontal and vertical magnifications can be adjusted independently, which is of great practical convenience and value. Records can be made with high vertical magnification to record minute irregularities, and at low horizontal magnification so as to cover an appreciable length of specimen.

Figures 3 and 4 show a modification of the device which is largely instrumental in overcoming the effects of extraneous vibration. The specimen 21, is mounted on a shaft 22, which shaft is carried in bearings 23, which in turn are mounted on a support 24, mounted on a wall or floor 25. The shaft 22, is connected through a flexible coupling 26, to an auxiliary shaft 27, by means of which the shaft is rotated by an electric motor or other convenient source of power. The tracer 31, and its associated magnet 30, is carried on a block 32, which is rigidly bolted to bearing support 24, by the bolts 33.

In another modification, the tracer assembly can be carried on an arm and the free end supported on the surface to be measured. If the surface or surfaces which contact the test specimen for this support are smooth and have a radius of curvature large compared with the irregularities which it is desired to measure, negligible extraneous indication will be introduced by this method of supporting the tracer assembly. Figure 5 illustrates this method of supporting the tracer assembly on the specimen. Here the tracer assembly 40, is carried on an arm 47, which is pivoted at 46, which pivot is carried by a nut 48, which is moved by a suitable screw mechanism 49, to cause the tracer to move over the specimen. The tracer assembly itself 40, is further supported by a pilot ball 41, of radius of curvature large compared with the surface irregularities. The tracer point carrier 44, passes through a hole 42 in the pilot 41, so as to permit tracer point 45 to contact the specimen 43.

Figures 6 and 7 show another tracer modification which is suitable for measuring surface waviness as well as roughness. The tracer assembly 51, is mounted in a groove on a straight bar 50, which is placed directly over and usually in contact with the specimen whose surface is to be investigated. Th tracer point 52, extends through a slot 54, in the bar 50, and contacts the surface 53. Trace is made by moving the tracer assembly 51, along the slot parallel to the nominal surface and with the tracer point 52 in contact with such surface.

Figure 9:
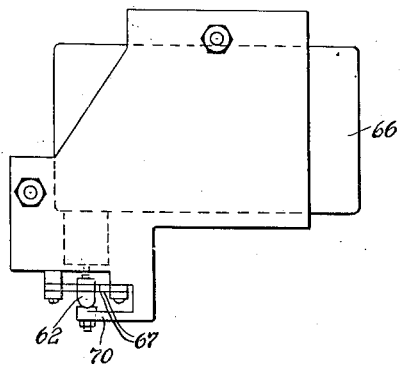
Figure 9 is a right hand side view of the Figure 8 device.
Figure 10:
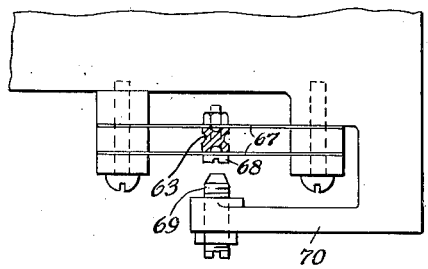
Figure 10 is an enlarged detail of the lower part of Figure 9, the beam being shown in cross section.

Figures 8, 9, and 10 show a modification suitable for measuring internal surfaces. The specimen 61, is mounted by means of a suitable adapter 72, to a shaft 73, which in turn is mounted in bearings 74, and arranged for rotation similar to Figure 3. The tracer assembly 66, carries a small arm 65, which carries a pivot 64. A bar 63, is supported by this pivot and the pair of weak springs 67, one being located above, and the other below it. The springs and beam are preferably tied together by a suitable bolt 68. A suitable stop 69, is carried on the bracket 70, for the purpose of limiting the motion of the bar 63. The tracer point 71, of the tracer assembly rests on the bar 63, while the actual tracing is done by the auxiliary tracer point 62, which is carried on the end of the arm 63. In this view the tracer point is shown as a comparatively dull point. This is done when one wishes to measure waviness, and difficulty is encountered with the finely spaced roughness. Obviously, an appropriate size of tracer tip can be used on any of the modifications described, depending on the type of irregularities it is desired to indicate or measure.

In many cases, particularly for shop use, it is not necessary to make a photographic record of the surface profile. Instead, it is more useful to obtain a running average of the height of the surface irregularities. This is accomplished by replacing the oscillograph of Figure 1 by a suitable A. C. voltmeter 20, as shown in Figure 11. This meter can be of conventional thermo, rectifier, or moving iron type, and serves to measure the magnitude of the output voltage of the amplifier. Since the voltage output of the amplifier, over a wide range of frequency of movements of the tracer point, is proportional to the displacement of the tracer point, where circuit connections of the type described are used, the meter can be graduated directly in terms of the height of the surface irregularities in inches. Such alternating current voltmeters are usually calibrated in terms of the R. M. S. (root-mean-square) value of the applied voltage, and have a certain averaging effect due to the ballistic characteristics of the meter. Thus, when used with the circuit described above, the meter automatically takes a running average of the R. M. S. height of the surface irregularities. This measurement has been found very useful for the practical rating of surface roughness.

Measurements on actual surfaces show that the profiles are very complex, and often a number of waves of different magnitudes and different wavelengths are present simultaneously. Further, these different waves do not repeat exactly, so that each part of the surface presents an individual profile. In practice it is found that these various types of irregularities are the result of different factors in the manufacturing operation, and it is desirable to measure them separately in order to determine the effects of changes in the method of producing the surface. Such separation is accomplished by use of special filter circuits, as indicated in Figure 11. These circuits may be "high pass," "low pass," or "bond pass," electrical wave filters of conventional design, or may be special electrical circuits consisting of resistors, condensers, and inductances so connected as to modify the frequency-response of the circuit to allow the desired surface characteristics to be separated and measured.

The above described filters and weighting circuits can obviously be used either with the oscillograph for visual observation and photographic recording, or with the modification employing a meter as the indicating means. By choosing suitable combinations of tracer point size, amplifier characteristics, speed of trace, means of moving the tracer point with respect to the specimen, horizontal and vertical magnifications, and measuring means at the amplifier output, the instrument can be arranged to measure surface irregularities of almost any size and character.

Having thus described my invention, I claim and desire to secure by Letters Patent:

1. Apparatus for use in determining the dimensions of the irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, an electrical corrective network receiving said voltages and weighting said voltages so that over a relatively wide frequency range of the voltages delivered from said network, such voltages are proportional to said perpendicular mechanical displacements of the tracer point, and indicating means responsive to the magnitude of said voltages.

2. Apparatus for use in determining the dimensions of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, means for amplifying said voltages, and indicating means responsive to the magnitude of said amplified voltages.

3. Apparatus for use in determining the dimensions of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, a vacuum tube amplifier for amplifying the said voltages, an electrical corrective network receiving said voltages and weighting said voltages so that over a relatively wide frequency range of the amplified voltages they are proportional to said perpendicular mechanical displacements of the tracer point, and indicating means responsive to the magnitude of said voltages.

4. Apparatus for use in determining the height of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, a vacuum tube amplifier for amplifying the said voltages, an electrical corrective network receiving said voltages and weighting said voltages so that over a relatively wide frequency range of the amplified voltages they are proportional to said perpendicular mechanical displacements of the tracer point, and an indicating alternating current voltmeter responsive to the magnitude of said voltages.

5. Apparatus for use in determining the height of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, said voltages being substantially proportional to the component of the velocity of motion of said tracer point produced by said perpendicular actuation thereof, an amplifier, an inverse-frequency-response circuit connected between the voltage producing means and the input of said amplifier, the said circuit comprising a resistance and a capacitance in series, the said voltage producing means being connected across the said resistance and capacitance, the input of said amplifier being connected across the capacitance only, and an alternating current voltmeter controlled by the output of said amplifier whereby an indication is given proportional to the magnitude of and inversely proportional to the frequency of the said voltages over a wide range of frequency of actuation of said tracer point.

6. Apparatus for use in determining the height of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, an amplifier, an inverse-frequency-response circuit connected between the voltage producing means and the input of said amplifier, the said circuit comprising a resistance and a capacitance in series, the said voltage producing means being connected across the said resistance and capacitance, the input of said amplifier being connected across the capacitance only, and an alternating current voltmeter controlled by the output of said amplifier whereby an indication is given proportional to the magnitude of and inversely proportional to the frequency of the said generated voltages over a wide range of actuation of said tracer point, said means for producing the voltages comprising two relatively movable members, one a permanent magnet and the other a coil mounted between the poles of the magnet, the movable one of the members being fixedly mounted with respect to the tracer point and the other one of the members being mounted so that it has no substantial component of motion perpendicular to the surface, the irregularities of which are to be indicated.

7. An apparatus for use in determining the dimensions of surface irregularities, which comprises in combination a tracer assembly which includes a tracer point adapted to be actuated by the geometrical irregularities of the surface being investigated as the said tracer assembly is moved substantially parallel to said surface with said tracer point in contact therewith, means for mounting said tracer point in said tracer assembly so as to restrict said tracer point to movement substantially perpendicular to said surface, pilot means for supporting said tracer assembly on said surface, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, an amplifier for said voltages, and indicating means responsive to the magnitude of said amplified voltages.

8. An apparatus for use in determining the dimensions of surface irregularities, which comprises in combination a bar adapted to be placed over the surface to be investigated, ways formed on the bar, said bar having a slot therethrough lengthwise of said ways, means adapted to move on said ways, a tracer point adapted to be actuated by the geometrical irregularities of the surface when moved in contact therewith, means for mounting said tracer point on said means adapted to move on said ways, said mounting restricting the tracer point to movement substantially perpendicular to said surface, said slot in the bar being of a size and location permitting said tracer point to move through said slot while being carried lengthwise thereof, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, an amplifier for said voltages, and indicating means responsive to the magnitude of said amplified voltages.

9. An apparatus used in determining the dimensions of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, an electric circuit means for receiving said voltages and delivering same so that when amplified the magnitude of the amplified voltages will be proportional to the magnitude of said perpendicular dipslacements of said tracer point over a relatively wide range of the frequency of its actuation, a vacuum tube amplifier for amplifying the said voltages, means for controlling the frequency-response of the vacuum tube amplifier by electric wave-filter circuits such that frequencies corresponding to a predetermined range of wave-lengths of surface irregularities are passed through and all others are excluded from the amplifier so that measurements are made on the desired wave-lengths without interference from the wave-lengths produced by other surface irregularities, and indicating means responsive to the magnitude of said amplified voltages.

10. An apparatus for use in determining the dimensions of surface irregularities, which comprises in combination a tracer assembly which includes a tracer point adapted to be actuated by the geometrical irregularities of the surface being investigated as the said tracer assembly is moved substantially parallel to said surface with said tracer point in contact therewith, means for mounting said tracer point in said tracer assembly so as to restrict said tracer point to movement substantially perpendicular to said surface, pilot means for supporting said tracer assembly on said surface, said pilot means being rounded in the area thereof which contacts the surface under investigation and supports the tracer assembly thereon, said tracer point contacting said surface adjacent to the area contacted by said pilot means, means for producing voltages by said perpendicular actuation of said tracer point, an electric circuit means for receiving said voltages and delivering same so that when amplified the magnitude of the amplified voltages will be proportional to the magnitude of said perpendicular displacement of said tracer point over a relatively wide range of the frequency of its actuation, an amplifier for said voltages, and indicating means responsive to the magnitude of said amplified voltages.

11. An apparatus for use in determining the dimensions of surface irregularities, which comprises in combination a tracer assembly which includes a tracer point adapted to be actuated by the geometrical irregularities of the surface being investigated as the said tracer assembly is moved substantially parallel to said surface with said tracer point in contact therewith, means for moving said tracer assembly, said means consisting of an arm member attached to said tracer assembly, a pivotal mounting for said arm member, said pivotal mounting permitting movement of said tracer assembly in a direction substantially perpendicular to the surface being investigated, and means for providing mechanical movement of said pivotal mounting substantially parallel to the surface under investigation, means for mounting said tracer point in said tracer assembly so as to restrict said tracer point to movement substantially perpendicular to said surface, pilot means for supporting said tracer assembly on said surface, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, an amplifier for said voltages, and indicating means responsive to the magnitude of said amplified voltages.

12. An apparatus for use in determining the dimensions of surface irregularities, which comprises in combination a tracer assembly which includes a tracer point adapted to be actuated by the geometrical irregularities of the surface being investigated as the said tracer assembly is moved substantially parallel to said surface with said tracer point in contact therewith, means for moving said tracer assembly, said means consisting of an arm member attached to said tracer assembly, a pivotal mounting for said arm member, said pivotal mounting permitting movement of said tracer assembly in a direction substantially perpendicular to the surface being investigated, and means for providing mechanical movement of said pivotal mounting substantially parallel to the surface under investigation, means for mounting said tracer point in said tracer assembly so as to restrict said tracer point to movement substantially perpendicular to said surface, pilot means for supporting said tracer assembly on said surface, said pilot means being rounded in the area thereof which contacts the surface under investigation and supports the tracer assembly thereon, said tracer point contacting said surface adjacent to the area contacted by said pilot means, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, an amplifier for said voltages, and indicating means responsive to the magnitude of said amplified voltages.

13. An apparatus for use in determining the dimensions of surface irregularities, which comprises in combination a tracer assembly which includes a tracer point adapted to be actuated by the geometrical irregularities of the surface being investigated as the said tracer assembly is moved substantially parallel to said surface with said tracer point in contact therewith, means for mounting said tracer point in said tracer assembly so as to restrict said tracer point to movement substantially perpendicular to said surface, pilot means for supporting said tracer assembly on said surface, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, an amplifier for said voltages, and means for obtaining an enlarged profile record of said surface irregularities by recording on a suitable medium, the instantaneous values of the voltage output of said amplifier in manner forming a graph whose coordinates are substantially proportional to the corresponding dimensions of the geometrical irregularities actuating said tracer point.

14. Apparatus for use in determining the dimensions of irregularities of the surface of a specimen, which comprises in combination a tracer assembly, said tracer assembly including a tracer point and means for mounting said tracer point to move and restrict it to movement substantially perpendicular to the surface being investigated, said tracer point being adapted to be actuated by the geometrical irregularities of said surface as said surface is moved substantially perpendicular to the path of restricted movement of said tracer point with said tracer point in contact with said surface, means for mounting said tracer assembly and holding same in substantially fixed location relative to movement in a direction perpendicular to the path of restricted movement of said tracer point, means for mounting said specimen, means for moving said specimen in manner such that the surface thereof to be investigated contacts and actuates said tracer point while moving at the point of contact in a direction substantially perpendicular to the path of restricted movement of said tracer point, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, means for amplifying said voltages, and indicating means responsive to the magnitude of said amplified voltages.

15. Apparatus for use in determining the dimensions of irregularities of surfaces, which comprises in combination a tracer point, means for mounting said tracer point to move and restrict it to movement substantially perpendicular to the surface being investigated, said tracer point being adapted to be actuated by the geometrical irregularities of said surface as said mounting means is moved substantially parallel to said surface with said tracer point in contact therewith, means for producing voltages by said perpendicular actuation of said tracer point, an electric circuit means for receiving said voltages and delivering same so that when amplified the magnitude of the amplified voltages will be proportional to the magnitude of said perpendicular displacements of said tracer point over a relatively wide range of the frequency of its actuation, means for amplifying said voltages, and indicating means responsive to the magnitude of said amplified voltages, said indicating means comprising a graphic recording means adapted to record on a suitable medium, a graph whose coordinates are substantially proportional to the corresponding dimensions of said geometrical irregularities actuating said tracer point.

ERNEST J. ABBOTT.